UNITED STATES PATENT OFFICE.

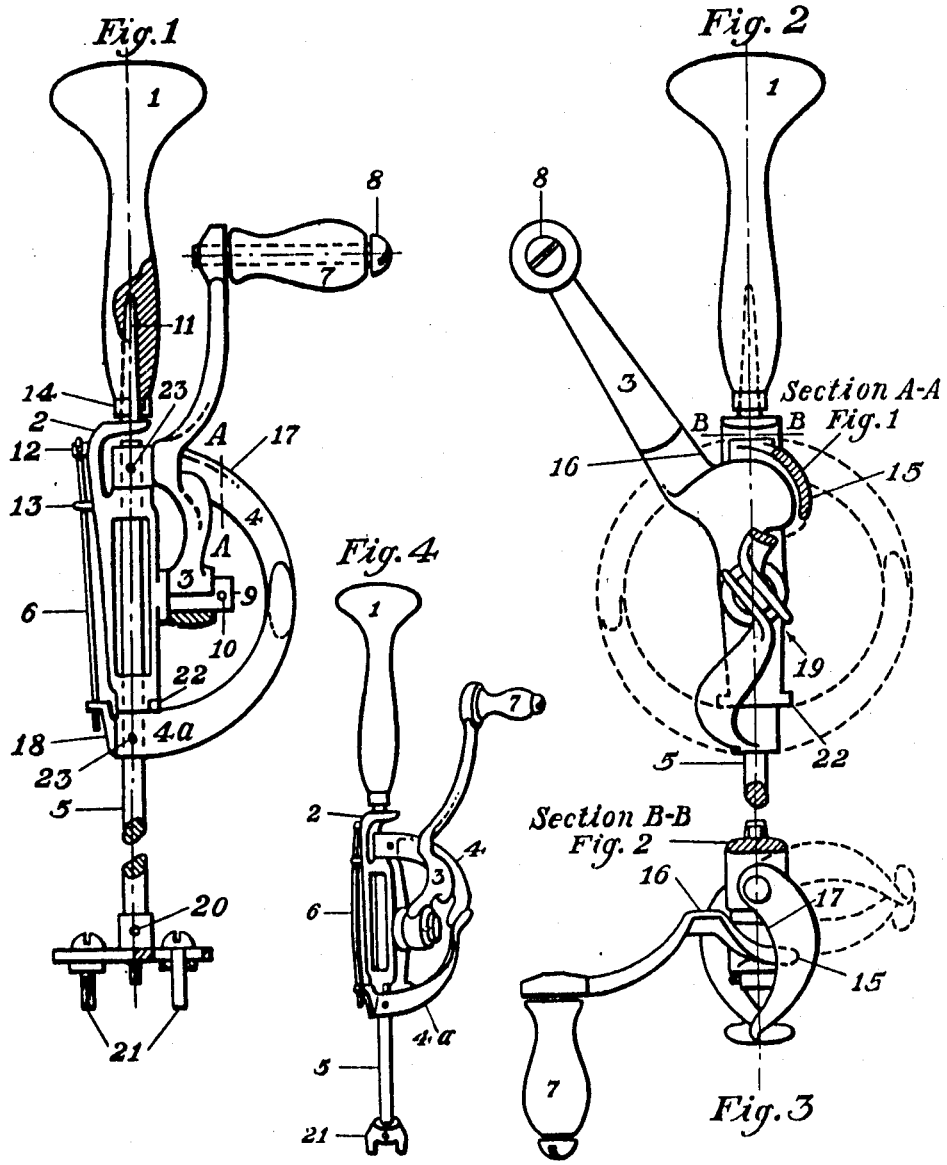

GEORGE R. LUM, OF SOUTH WILTON, CONNECTICUT.

VALVE-GRINDING MACHINE.

1,199,474.  Specification of Letters Patent.  Patented Sept. 26, 1916.

Application filed November 13, 1915. Serial No. 61,434.

*To all whom it may concern:*

Be it known that I, GEORGE R. LUM, a citizen of the United States, residing at South Wilton, in the county of Fairfield and State of Connecticut, have invented a new and useful Valve-Grinding Machine, of which the following is a specification.

My invention relates to grinding or seating puppet valves to make them gas tight, and consists of cam controlled means adapted, from a rotary motion, to oscillate the valves in their seats.

An embodiment of this invention is illustrated in the accompanying drawings, in which:

Figure 1 is a side view of the complete device. Fig. 2 is a front view, partly in section on the line A, A Fig. 1. Fig. 3 is a sectional plan view on the line B, B, Fig. 2, and: Fig. 4, is a perspective view.

The center member 2 constitutes the frame or stationary part of the machine; it is held by a handle 1 seated on the shank 11 and strengthened by a ferrule 14.

A stud 9 extending from the center member 2 carries a crank handle, which is retained thereon by a pin 10. The arm 3 of the crank handle has an inclined portion 16 which merges into a cam shaped lateral extension 15. The arm 3 is provided with an operating handle 7 held thereon by a screw stud 8.

Seated in bearings in the frame 2 is a vertical shaft 5, and to this shaft, above and below its bearings, are secured similarly formed arcuate cam wings 4 and 4ª by means of pins 23. The free ends of these cam wings are inclined and spaced a short distance apart to afford a free passage for, and prevent lost motion of, the crank arm 3 as its inclined part 16 passes from one of the wings to the other.

A spring is provided for normally holding the wings 4 and 4ª in central position, as shown in Figs. 1, 2 and 3, and for holding the coacting cam surfaces of the wings and the crank handle arm in contact when the handle is rotated. A suitable spring for this purpose is a double acting spring 6, whose upper end is rigidly secured to the frame 2 by a short post 12, around which the end of the spring is bent, and a perforated lug 13, through which the spring passes, and whose lower end extends through a perforated lug 18 on the lower wing 4ª.

Lugs 22 at the lower end of the frame 2 act as stops to prevent the wings 4 and 4ª passing beyond the field of action of the crank handle.

On the lower end of the shaft 5 is a head held by a pin 20 and provided with means for connection to valves in their seats, such as adjustable pin screws 21, Fig. 1, or fixed pins as shown at Fig. 4.

The wings 4 and 4ª and the coacting parts of the crank handle 3 are so formed and proportioned that uniform rotation of the crank handle will impart substantially oscillatory motion to the shaft 5 through an arc of about 180°.

Upon right hand rotation of the crank handle, starting with the parts in normal position as shown, the cam extension of the handle acts on the inner side of the wing 4 and moves it through an arc of about 90° into position indicated by the dotted lines at the right of Figs. 2 and 3; the inclined part 16 of the arm 3 then passes through the inclined passage 19 between the ends of the wings and the cam extension 15 acts on the inner side of the wing 4ª to bring the parts back to starting position, the handle then having made one-half revolution. During the second half of the revolution corresponding actions occur, the cam 15 first acts on the inner side of wing 4ª, in reverse direction, and sets the wings into left hand position, shown in Fig. 2; the inclined part 16 of the arm 3 then passes through the opening 19 and the cam extension 15 by acting on the wing 4 sets the wings again into their normal position, shown.

I claim:

1. A valve grinding machine, comprising a holding frame, a valve controlling shaft having bearings therein, arcuate wings secured to the shaft, a crank handle having a bearing on the holding frame at right angles to the shaft and coacting cams on the crank handle and the arcuate wings, whereby continuous rotation of the crank handle imparts oscillatory motion to the shaft.

2. A valve grinding machine, comprising a holding frame, a valve controlling shaft having bearings therein, arcuate wings secured to the shaft, a crank handle having a bearing on the holding frame at right angles to the shaft, coacting cams on the crank handle and the arcuate wings and a spring connected to the holding frame and adapted to hold the arcuate wings in central position.

3. A valve grinding machine, comprising a holding frame, a valve controlling shaft having bearings therein, a crank handle having a bearing on the holding frame at right angles to the shaft, arcuate wings secured to the shaft and having their free ends adjacent and spaced apart to afford a passage for the arm of the crank handle as it passes from one wing to the other, and coacting cams on the crank handle and the arcuate wings, whereby continuous rotation of the crank handle imparts oscillatory motion to the shaft.

4. A valve grinding machine, comprising a holding frame, a valve controlling shaft having bearings therein, a crank handle having a bearing on the holding frame at right angles to the shaft and having a portion of its arm inclined, arcuate wings secured to the shaft and having their free adjacent ends inclined and spaced apart to afford a passage for the inclined portion of the crank handle arm as it passes from one wing to the other, whereby lost motion is prevented as the crank arm moves from one of the wings to act on the other, and coacting cams on the crank handle arm and the arcuate wings.

5. A valve grinding machine, comprising a holding frame, a valve controlling shaft having bearings therein, a crank handle having a bearing on the holding frame at right angles to the shaft and having a portion of its arm inclined, a lateral cam extension on the arm merging into the inclined portion, arcuate wings secured to the shaft, provided with cam surfaces against which the cam on the crank arm acts, the free adjacent ends of the wings being inclined and spaced apart to afford a passage for the inclined portion of the crank arm as it passes from either one of the wings to the other.

GEORGE R. LUM.

Witnesses:
 PHILIP D. MASON,
 GRACE F. MASON.

Copies of this patent may be obtained for five cents each, by addressing the "Commissioner of Patents, Washington, D. C."